United States Patent
Bi et al.

(10) Patent No.: US 11,697,101 B2
(45) Date of Patent: Jul. 11, 2023

(54) METHOD FOR PREPARING PHOSPHOLIPID MICELLES

(71) Applicant: Guangdong University of Petrochemical Technology, Maoming (CN)

(72) Inventors: Hongmei Bi, Maoming (CN); Guobin Shi, Maoming (CN); Liuchun Guo, Maoming (CN); Yingmei Zhang, Maoming (CN)

(73) Assignee: GUANGDONG UNIVERSITY OF PETROCHEMICAL TECHNOLOGY, Maoming (CN)

( * ) Notice: Subject to any disclaimer, the term of this patent is extended or adjusted under 35 U.S.C. 154(b) by 0 days.

(21) Appl. No.: 17/979,033

(22) Filed: Nov. 2, 2022

(65) Prior Publication Data

US 2023/0182101 A1    Jun. 15, 2023

(30) Foreign Application Priority Data

Dec. 10, 2021 (CN) .......................... 202111507705.9

(51) Int. Cl.
*B01J 13/04* (2006.01)
*B01J 13/12* (2006.01)

(52) U.S. Cl.
CPC ............. *B01J 13/04* (2013.01); *B01J 13/125* (2013.01)

(58) Field of Classification Search
CPC ......... B01J 13/04; B01J 13/125; B01J 13/126
See application file for complete search history.

(56) References Cited

FOREIGN PATENT DOCUMENTS

| CN | 109297784 A | | 2/2019 |
|---|---|---|---|
| CN | 109297789 | * | 2/2019 |
| CN | 113030209 A | | 6/2021 |

* cited by examiner

*Primary Examiner* — Carlos A Azpuru
(74) *Attorney, Agent, or Firm* — Mayer & Williams PC

(57) ABSTRACT

Disclosed is a controllable method for preparing phospholipid micelles, including: S1, preparing small phospholipid vesicles; S2, preparing a graphene thin-layer electrode substrate, S3, incubating, and S4, electroforming phospholipid micelles. According to the present application, lamellar graphene is used as the electrode substrate according to the present application, where a phospholipid bilayer film is firstly spread on the surface of the substrate, and phospholipid micelles are controlled in terms of formation as well as formation state by a certain alternating current electric field on the surface of graphene; the developed method of the present application is unique in design, simple in operation, and has the advantages of fast formation, short preparation cycle and good controllability.

8 Claims, 4 Drawing Sheets

```
┌─────────────────────────────────────────────────────────────────┐
│ Preparing small phospholipid vesicles: primarily removing       │── S1
│ solvent of phospholipid chloroform solution, then fully drying  │
│ the phospholipid chloroform solution in a vacuum drying oven to │
│ completely remove chloroform solvent, followed by adding with   │
│ deionized water and subjecting to ultrasonic treatment under    │
│ heating; then preparing a small phospholipid vesicle solution   │
│ by extruding with a micro extruder                              │
└─────────────────────────────────────────────────────────────────┘
                                │
                                ▼
┌─────────────────────────────────────────────────────────────────┐
│ Preparing a graphene thin-layer electrode substrate: pressing   │── S2
│ and sticking a transparent adhesive tape on a surface of flat   │
│ layer of a large graphene, and quickly tearing down the tape    │
│ in parallel to obtain a flat graphene thin layer on the         │
│ transparent adhesive tape, namely a graphene thin-layer         │
│ electrode substrate                                             │
└─────────────────────────────────────────────────────────────────┘
                                │
                                ▼
┌─────────────────────────────────────────────────────────────────┐
│ Dropwise adding small phospholipid vesicle solution with the    │── S3
│ size of 100 nm - 200 nm and salt solution onto the graphene     │
│ thin-layer electrode substrate in turn, incubating the          │
│ substrate at 50 - 70 °C, and washing the substrate to obtain    │
│ an incubated thin-layer electrode with phospholipid monolayer   │
└─────────────────────────────────────────────────────────────────┘
                                │
                                ▼
┌─────────────────────────────────────────────────────────────────┐
│ Electroforming phospholipid micelles:                           │── S4
│ connecting the incubated thin layer electrode with phospholipid │
│ monolayer and a platinum wire electrode to electrodes of an     │
│ electrochemical workstation respectively under temperature of   │
│ 50°C - 70°C and electrochemical potential of -2 V - +2 V,       │
│ followed by reaction for 2 min - 10 min to obtain phospholipid  │
│ micelles with different depths and widths on the incubated      │
│ thin-layer electrode with phospholipid monolayer; the obtained  │
│ phospholipid micelles maintain a stable micellar morphology     │
│ below 40°C.                                                     │
└─────────────────────────────────────────────────────────────────┘
```

FIG. 4

METHOD FOR PREPARING PHOSPHOLIPID MICELLES

CROSS-REFERENCE TO RELATED APPLICATIONS

This application claims priority to Chinese Patent Application No. 202111507705.9, filed on Dec. 10, 2021, the contents of which are hereby incorporated by reference.

TECHNICAL FIELD

The present application relates to a method for preparing phospholipid micelles.

BACKGROUND

Phospholipid is one of the basic components of biological membranes, while phospholipid membranes and phospholipid micelles are the best models for studying the properties of biological membranes, such as transmembrane potential, phospholipid rejuvenation, and intermembrane information transfer, etc. Currently, phospholipid micelles are mostly prepared by ultrasonic method, solvent changing method, natural hydration method, etc., which mainly rely on the self-assembly of phospholipid molecules, and the resulted micelles are inhomogeneous in morphology and size with lack of controllability. In particular, there is no method for preparing phospholipid micelles in a controlled manner using electric fields.

SUMMARY

In order to solve the problem that the existing methods for preparing phospholipid micelles rely mainly on the self-assembly of phospholipid molecules, and the prepared micelles are inhomogeneous in morphology and size with insufficient controllability, the present application provides a controllable method for preparing phospholipid micelles.

According to a technical scheme of the present application, molecules themselves are promoted to rotate using an applied electric field, leading to a recombination of molecules to form micelles, thus the controllable method for preparing phospholipid micelles is provided, and the method is operationally simple, with rapid preparation and good controllability.

A controllable method for preparing phospholipid micelles, including:

S1, preparing small phospholipid vesicles:

primarily removing solvent of phospholipid chloroform solution, then fully drying the phospholipid chloroform solution in a vacuum drying oven to completely remove chloroform solvent, followed by adding with deionized water and subjecting to ultrasonic treatment under heating; then preparing a small phospholipid vesicle solution with a size of 100 nano-meters (nm) to 200 nm by extruding with a micro extruder;

S2, preparing a graphene thin-layer electrode substrate:

pressing and sticking a transparent adhesive tape on a surface of flat layer of a large graphene, and quickly tearing down the tape in parallel to obtain a flat graphene thin layer on the transparent adhesive tape, namely a graphene thin-layer electrode substrate;

S3, dropwise adding small phospholipid vesicle solution with the size of 100 nm-200 nm and salt solution onto the graphene thin-layer electrode substrate in turn, incubating the substrate at 50-70 degree Celsius (° C.), and washing the substrate to obtain an incubated thin-layer electrode with phospholipid monolayer;

S4, electroforming phospholipid micelles:

connecting the incubated thin layer electrode with phospholipid monolayer and a platinum wire electrode to electrodes of an electrochemical workstation respectively under temperature of 50° C -70° C. and electrochemical potential of −2 Volts (V)-+2 V, followed by reaction for 2 minutes (min)-10 min to obtain phospholipid micelles with different depths and widths on the incubated thin-layer electrode with phospholipid monolayer; the obtained phospholipid micelles maintain a stable micellar morphology below 40° C.

The present application has the advantages that:

firstly, lamellar graphene is used as the electrode substrate according to the present application, where a phospholipid bilayer film is firstly spread on the surface of the substrate, and phospholipid micelles are controlled in terms of formation as well as formation state by a certain alternating current (AC) electric field on the surface of graphene; the developed method of the present application is unique in design, simple in operation, and has the advantages of fast formation, short preparation cycle and good controllability;

secondly, the electrode substrate of the present application is graphene thin-layer with high flatness, and the developed controllable method for preparing phospholipid micelles provides a solution for expanding the research on the electrical properties of phospholipid membranes related to phospholipid micelles in the fields of cell biology, biochemistry and bionanotechnology, and provides a reliable technical method for conducting research on the solubilization of insoluble drugs by phospholipid micelles in the field of medicine, promoting absorption and improving drug efficacy; and thirdly, with conductive and flat graphene thin-layer as electrode substrate, the controllable method for preparing phospholipid micelles is developed using potential voltage provided by the electrochemical workstation; and this newly developed method fills the gap of phospholipid micelle preparation method and expands the application scope of graphene with excellent controllability.

BRIEF DESCRIPTION OF THE DRAWINGS

FIG. 4 is a processing illustrating a controllable method for preparing phospholipid micelles provided by an embodiment of the present application.

DETAILED DESCRIPTION OF THE EMBODIMENTS

Figure 1:
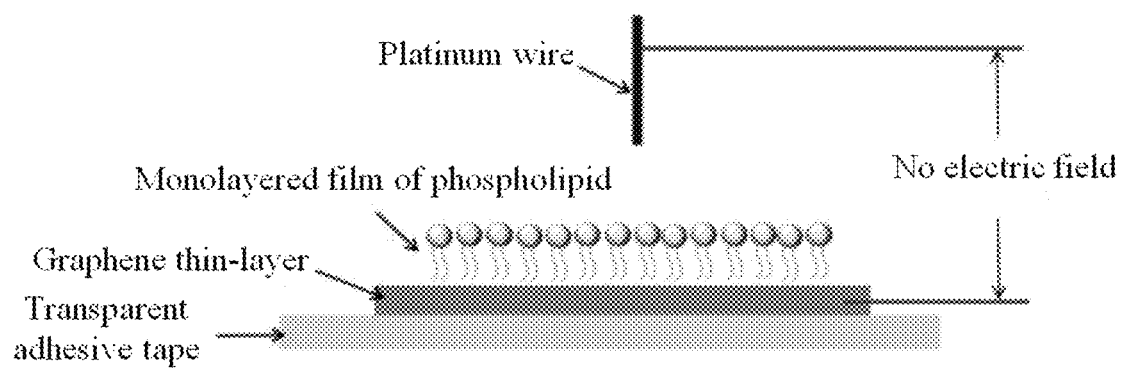
FIG. 1 shows a schematic diagram of an incubated thin-layer electrode with phospholipid monolayer prepared in verification embodiment 1.

The following embodiments provide further illustration of the present application, which shall not be construed as limiting the present application. Modifications and substitutions made to the methods, steps or conditions of the present application without departing from the substance of the present application are within the scope of the present application.

Embodiment 1: the present embodiment provides a controllable method for preparing phospholipid micelles as shown in FIG. 4, including:

S1, preparing small phospholipid vesicles:

primarily removing solvent of phospholipid chloroform solution, then fully drying the phospholipid chloroform solution in a vacuum drying oven to completely remove chloroform solvent, followed by adding with deionized water and subjecting to ultrasonic treatment under heating; then preparing a small phospholipid vesicle solution with a size of 100 nano-meters (nm) to 200 nm by extruding with a micro extruder;

S2, preparing a graphene thin-layer electrode substrate:

pressing and sticking a transparent adhesive tape on a surface of flat layer of a large graphene, and quickly tearing down the tape in parallel to obtain a flat graphene thin layer on the transparent adhesive tape, namely a graphene thin-layer electrode substrate;

S3, dropwise adding small phospholipid vesicle solution with the size of 100 nm-200 nm and salt solution onto the graphene thin-layer electrode substrate in turn, incubating the substrate at 50-70 degree Celsius (° C.), and washing the substrate to obtain an incubated thin-layer electrode with phospholipid monolayer;

S4, electroforming phospholipid micelles:

connecting the incubated thin layer electrode with phospholipid monolayer and a platinum wire electrode to electrodes of an electrochemical workstation respectively under temperature of 50° C.-70° C. and electrochemical potential of −2 Volts (V)-+2 V, followed by reaction for 2 minutes (min)-10 min to obtain phospholipid micelles with different depths and widths on the incubated thin-layer electrode with phospholipid monolayer; the obtained phospholipid micelles maintain a stable micellar morphology below 40° C.

Embodiment 2: the present embodiment differs from Embodiment 1 in that the phospholipid in S1 of the present embodiment is dipalmitoyl phosphatidic acid or dipalmitoyl phosphatidylcholine; and others are the same as those of Embodiment 1.

Embodiment 3: the present embodiment differs from Embodiment 1 in that the S1 of the present embodiment includes: primarily removing solvent of phospholipid chloroform solution, then fully drying the phospholipid chloroform solution in a vacuum drying oven of 20° C.-40° C. for 20 hours (h)-24 h to completely remove chloroform solvent, followed by adding with deionized water and subjecting to ultrasonic treatment under heating of 50° C.-70° C.; and others are the same as those of Embodiment 1.

Embodiment 4: the present embodiment differs from Embodiment 1 in that the phospholipid in S1 of the present embodiment is in a mass-volume ratio of (1 gram (g) to 2 g):(1 milliliter (mL) to 2 mL) to deionized water; and others are the same as the Embodiment 1.

Embodiment 5: the present embodiment differs from Embodiment 1 in that the ultrasonic treatment in S1 of the present embodiment adopts power of 200 watts (W)-300 W with a duration of 5-10 min; and others are the same as those of Embodiment 1.

Embodiment 6: the present embodiment differs from Embodiment 1 in that the micro extruder in S1 of the present embodiment is equipped with a filter membrane with pore diameter of 100 nm to 200 nm; and others are the same as those of Embodiment 1.

Embodiment 7: the present embodiment differs from Embodiment 1 in that the graphene thin-layer electrode substrate in S2 of the present embodiment is longer than 0.5 centimeter (cm) and wider than 0.5 cm; and others are the same as those of Embodiment 1.

Embodiment 8: the present embodiment differs from Embodiment 1 in that the small phospholipid vesicle solution with the size of 100 nm to 200 nm in S3 of the present embodiment is in a volume ratio of (10 microliters (μL)-50 μL):(100 μL-200 μL) to the salt solution; and others are the same as those of Embodiment 1.

Embodiment 9: the present embodiment differs from Embodiment 1 in that the incubating in S3 of the present embodiment is carried out for a duration of 30-60 min, and the salt solution in S3 of the present embodiment is in a concentration of 130 millimoles per liter (mmol/L) to 150 mmol/L; and the salt solution includes NaCl solution or KCl solution; others are the same as those of Embodiment 1.

Embodiment 10: the present embodiment differs from Embodiment 1 in that the S3 of the present embodiment adopts NaCl solution or KCl solution with a concentration of 130 mmol/L to 150 mmol/L for washing the substrate, and the NaCl solution or KCl solution is in a volume ratio of 2 mL:(10 μL-50 μL) to the small phospholipid vesicle solution with a size of 100 nm to 200 nm.

The following is a verification embodiment to verify the present application in terms of beneficial effects.

Figure 2:
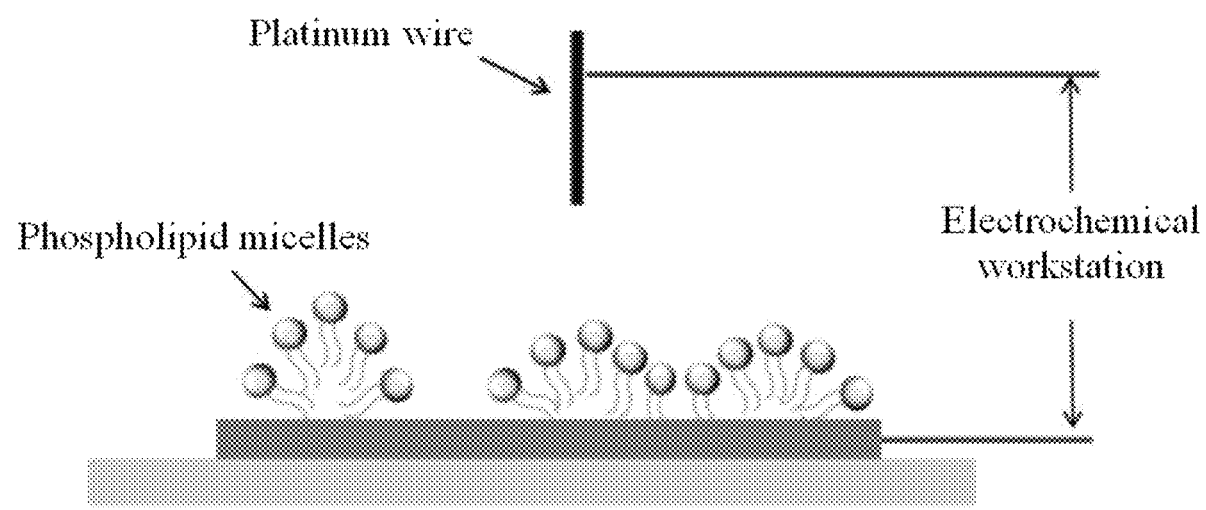
FIG. 2 shows a schematic diagram of dipalmitoyl phosphatidylcholine phospholipid micelles prepared in verification embodiment 1.
Figure 3:
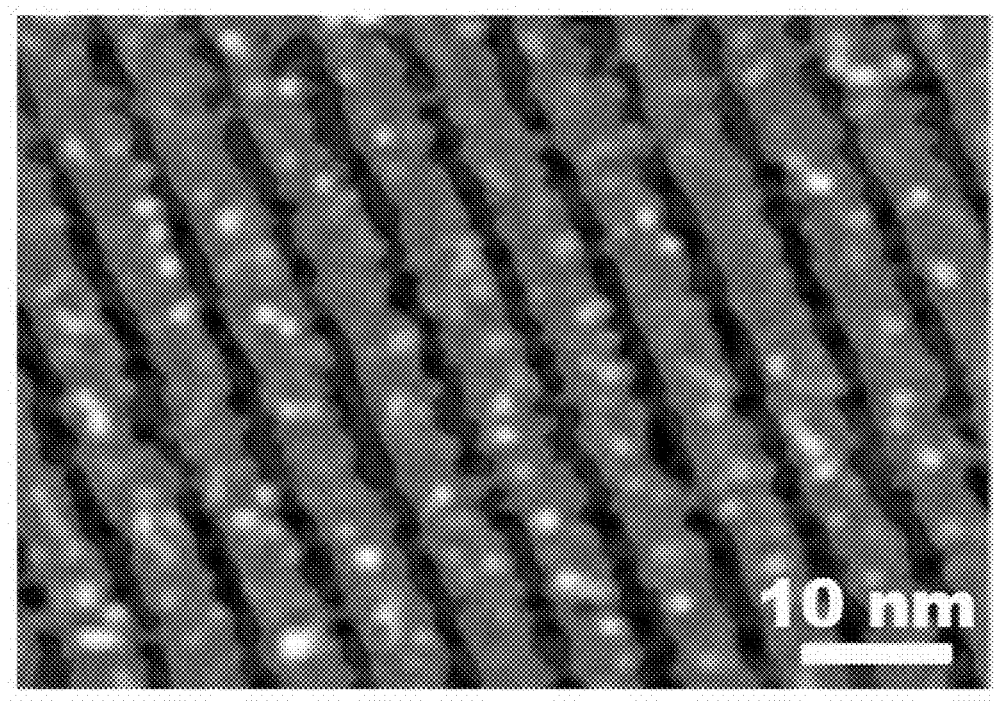
FIG. 3 is a picture of dipalmitoyl phosphatidylcholine phospholipid micelles prepared in verification embodiment 1.

Verification embodiment 1: with reference to FIGS. 1-3, the present verification embodiment illustrates a controllable method for preparing phospholipid micelles, including:

S1, preparing small phospholipid vesicles:

primarily removing solvent of chloroform solution containing 1 g dipalmitoyl phosphatidylcholine, then fully drying the chloroform solution in a vacuum drying oven at 26° C. for 24 h to completely remove chloroform solvent, followed by adding with 1 mL deionized water and subjecting to ultrasonic treatment of 250 W under heating of 50° C. for 5 min; then preparing a small phospholipid vesicle solution with a size of 100 nm by extruding with a micro extruder with a filter membrane of pore diameter of 100 nm;

S2, preparing a graphene thin-layer electrode substrate:

pressing and sticking a transparent adhesive tape on a surface of flat layer of a large graphene, and quickly tearing down the tape in parallel to obtain a flat graphene thin layer on the transparent adhesive tape, namely a graphene thin-layer electrode substrate;

where the graphene thin-layer electrode substrate in S2 is longer than 0.5 cm and wider than 0.5 cm;

S3, dropwise adding 10 μL small phospholipid vesicle solution with the size of 100 nm-200 nm and 150 μL KCl solution with a concentration of 150 mmol/L onto the graphene thin-layer electrode substrate in turn, incubating the substrate at 50° C. for 40 min, and gently washing the substrate with 2 mL KCl solution of a concentration of 150 mmol/L to obtain an incubated thin-layer electrode with phospholipid monolayer;

where the incubated thin-layer electrode with phospholipid monolayer in S3 forms a monolayered film of phospholipid;

S4, electroforming phospholipid micelles:

connecting the incubated thin layer electrode with phospholipid monolayer and a platinum wire electrode to electrodes of an electrochemical workstation respectively under temperature of 50° C. and electrochemical potential of 1 V, followed by reaction for 10 min to obtain dipalmitoyl phosphatidylcholine phospholipid micelles with different depths and widths on the incubated thin-layer electrode with phospholipid monolayer; and the obtained dipalmitoyl phosphatidylcholine phospholipid micelles maintain a stable micellar morphology below 40° C.

FIG. 3 is a picture of dipalmitoyl phosphatidylcholine phospholipid micelle prepared in verification embodiment 1, from which it can be seen that the phospholipid micelles prepared in verification embodiment 1 are arranged neatly, with a width of about 6 nm and a uniform size, indicating that the method for preparing phospholipid micelles provided by the present application possesses good controllability.

What is claimed is:

1. A controllable method for preparing phospholipid micelles, comprising:
   S1, preparing small phospholipid vesicles:
     removing solvent of phospholipid chloroform solution, then fully drying the phospholipid chloroform solution in a vacuum drying oven to completely remove chloroform solvents, adding with deionized water and subjecting to ultrasonic treatment under heating; then preparing small phospholipid vesicle solution with a size of 100 nano-meters (nm) to 200 nm by extruding with a micro extruder;
   wherein the phospholipid in the S1 is a dipalmitoyl phosphatidic acid or dipalmitoyl phosphatidylcholine;
   the phospholipid in the S1 is in a mass-volume ratio of (1 gram (g) to 2 g):(1 milliliter (mL) to 2 mL) to the deionized water;
   S2, preparing a graphene thin-layer electrode substrate:
     pressing and sticking a transparent adhesive tape on a surface of a flat layer of a large graphene, and quickly tearing down the tape in parallel to obtain a flat graphene thin layer on the transparent adhesive tape, the graphene thin-layer electrode substrate;
   S3, dropwise adding small phospholipid vesicle solution with the size of 100 nm-200 nm and salt solution onto the graphene thin-layer electrode substrate in turn, incubating the substrate at 50-70 degree Celsius (° C.), and washing the substrate to obtain an incubated thin-layer electrode with phospholipid monolayer; and
   S4, electroforming phospholipid micelles:
     connecting the incubated thin layer electrode with phospholipid monolayer and a platinum wire electrode to electrodes of an electrochemical workstation respectively under a temperature of 50° C.-70° C. and electrochemical potential of −2 Volts (V)-+2 V, followed by reaction for 2 minutes (min)-10 min to obtain phospholipid micelles with different depths and widths on the incubated thin-layer electrode with phospholipid monolayer; maintaining the obtained phospholipid micelles under a stable micellar morphology below 40° C.

2. The controllable method for preparing phospholipid micelles according to claim 1, wherein the S1 comprises primarily removing solvent of phospholipid chloroform solution, then fully drying the phospholipid chloroform solution in a vacuum drying oven of 20° C.-40° C. for 20 hours (h)-24 h to completely remove the chloroform solvents, adding with the deionized water and subjecting to ultrasonic treatment under a heating temperature of 50° C.-70° C.

3. The controllable method for preparing phospholipid micelles according to claim 1, wherein the ultrasonic treatment in the S1 adopts a power of 200 watts (W)-300 W with a duration of 5-10 min.

4. The controllable method for preparing phospholipid micelles according to claim 1, wherein the micro extruder in the S1 is equipped with a filter membrane with a pore diameter of 100 nm to 200 nm.

5. The controllable method for preparing phospholipid micelles according to claim 1, wherein the graphene thin-layer electrode substrate in the S2 is longer than 0.5 centimeter (cm) and wider than 0.5 cm.

6. The controllable method for preparing phospholipid micelles according to claim 1, wherein the small phospholipid vesicle solution with the size of 100 nm to 200 nm in the S3 is in a volume ratio of (10 microliters (μL)-50 μL):(100 μL-200 μL) to the salt solution.

7. The controllable method for preparing phospholipid micelles according to claim 1, wherein the incubating in the S3 is carried out for a duration of 30-60 min, the salt solution in the S3 is in a concentration of 130 millimoles per liter (mmol/L) to 150 mmol/L; and the salt solution comprises NaCl solution or KCl solution.

8. The controllable method for preparing phospholipid micelles according to claim 1, wherein NaCl solution or KCl solution with a concentration of 130 mmol/L to 150 mmol/L is adopted in the S3 for washing the substrate, and the NaCl solution or KCl solution is in a volume ratio of 2 mL:(10 μL-50 μL) to the small phospholipid vesicle solution with a size of 100 nm to 200 nm.

* * * * *